United States Patent [19]

Rosanes

[11] Patent Number: 4,550,416
[45] Date of Patent: Oct. 29, 1985

[54] DIGITAL TRANSMITTER

[75] Inventor: A. Rosanes, Centerport, N.Y.

[73] Assignee: Hazeltine Corporation, Commack, N.Y.

[21] Appl. No.: 462,325

[22] Filed: Jan. 31, 1983

[51] Int. Cl.$^4$ .............................................. H04J 3/16
[52] U.S. Cl. ................................ 375/59; 340/310 A; 370/77
[58] Field of Search ..................... 375/23, 24, 25, 35, 375/59, 38; 370/77, 78, 111, 112; 340/310 A, 870.13, 310 R; 322/9 R, 21; 455/108

[56] References Cited

U.S. PATENT DOCUMENTS

| | | | |
|---|---|---|---|
| 3,270,321 | 8/1966 | Berkowitz | 370/77 |
| 3,349,181 | 10/1967 | Sukehiroito | 370/77 |
| 3,414,818 | 12/1968 | Reidel | 375/24 |
| 3,444,320 | 5/1969 | Miyagi | 370/77 |
| 3,517,131 | 6/1970 | Becker | 375/38 |
| 3,786,423 | 1/1974 | Martell | 340/870.13 |
| 3,995,120 | 11/1976 | Pachynski, Jr. | 370/111 |
| 4,027,301 | 5/1977 | Mayer | 370/112 |
| 4,121,050 | 10/1978 | Witt | 375/56 |
| 4,387,460 | 6/1983 | Boutmy et al. | 370/111 |
| 4,399,558 | 8/1983 | Smollin | 455/108 |

Primary Examiner—Robert L. Griffin
Assistant Examiner—Stephen Chin
Attorney, Agent, or Firm—E. A. Onders; F. R. Agovino

[57] ABSTRACT

A solid state remote monitoring transmitter which transmits a 40 bit word that contains status information about a transformer via the secondary of a power distribution network to a central receiver associated with the primary (feeder) cable supplying the transformer. A program card specifies the carrier signal frequency and the identification of the transmitter. Multiple analog inputs are switched through a multiplexer to an A/D converter, the output of which is stored in a shift register to form the 40-bit word. The work is DPSK - coded by clock pulses in sychronism to the 60 Hz zero crossings of the AC power source and amplified by an unregulated power supply which is also powered by the AD power source. The phase transistion of the DPSK - coded word occur at the zero crossings diminishing any transients in the transmitter circuitry which would be caused by the phase transitions.

5 Claims, 3 Drawing Figures

DIGITAL TRANSMITTER

BACKGROUND OF THE INVENTION

1. Field of the Invention

The invention relates generally to remote monitoring system (RMS) transmitters and, in particular, a RMS transmitter for transmitting digital information over power lines.

2. Description of the Prior Art

Digital transmitters are well known in the prior art. However, the format of such transmitters has usually been found to be unacceptable for remote monitoring system transmitters used with the power distribution networks.

SUMMARY OF THE INVENTION

It is an object of this invention to provide a digital transmitter providing a signal format for use with power distribution networks.

The apparatus according to the invention is for transmitting, in digital form, analog information available at three analog outputs. First means provides the analog information. Second means converts the analog information to digital information. Third means stores the digital information in the following sequence: digital information corresponding to the analog information available at the first output followed by identification information followed by digital information corresponding to the analog information available at the second output followed by data information followed by digital information corresponding to the analog information available at the third output. Fourth means modulates a carrier signal with the stored digital information. Fifth means transmits the modulated carrier signal along the secondary of a power distribution network. Timing means, responsive to a clock, controls the third means for storing and the fourth means.

DETAILED DESCRIPTION OF THE INVENTION

Figure 1:
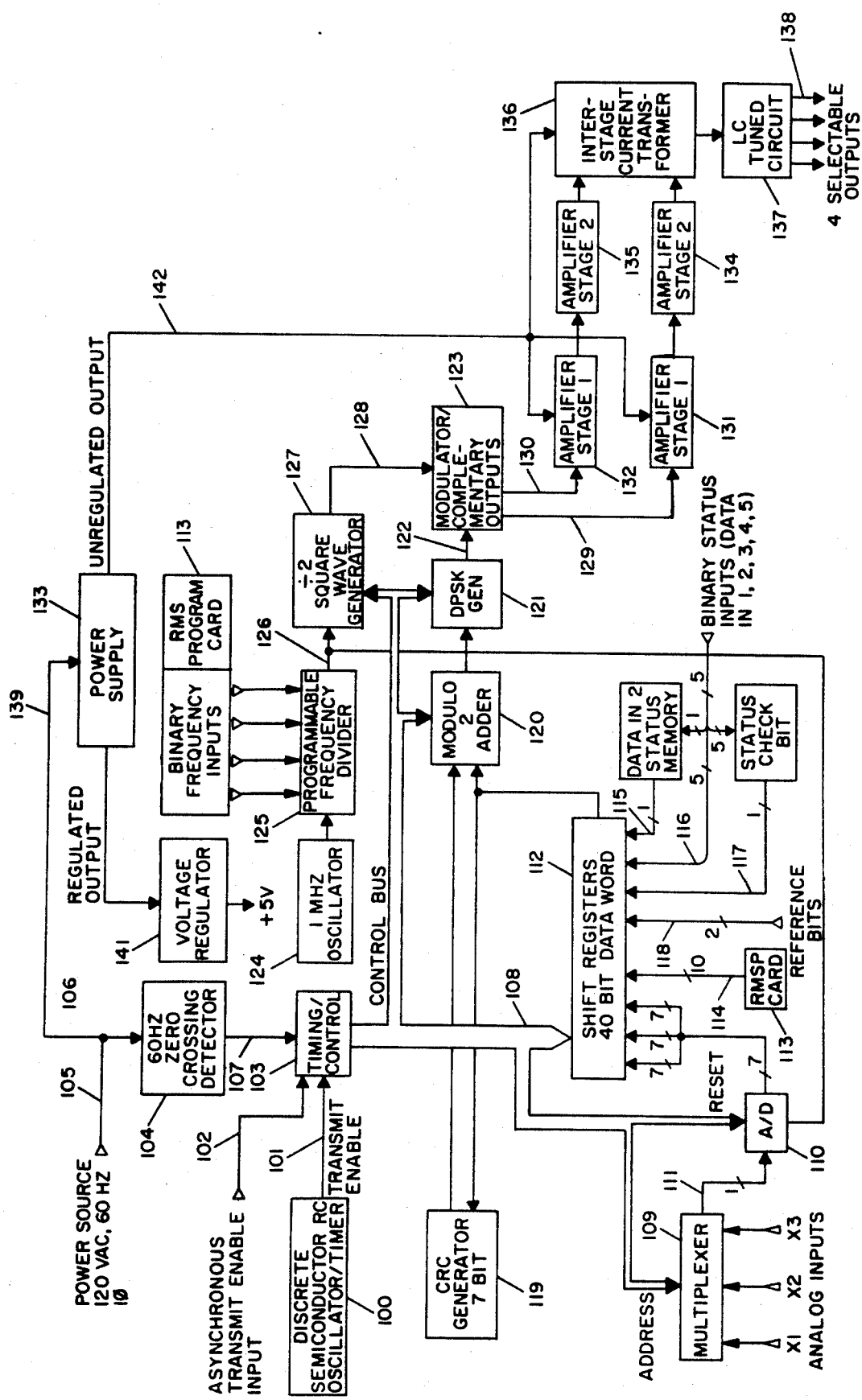
FIG. 1 is a functional block diagram of an expanded Remote Monitoring System Transmitter.

FIG. 1 is a functional block diagram of an Expanded Remote Monitoring System (RMS) Transmitter. It is a solid state monitoring transmitter which transmits to a central receiver a power line carrier signal such as a 40 bit word that contains status information about an apparatus with which it is associated, such as a transformer. In the embodiment described, the 40 bit word is transmitted over power lines to the central receiver. However, it is contemplated that the status information may be transmitted over any known medium or by any standard state-of-the-art means to the central receiver.

The operation of the Expanded RMS Transmitter as illustrated in FIG. 1 includes a set-up cycle followed by a transmit cycle. Each cycle is divided into a series of contiguous time epochs of equal pulse length. The embodiment illustrated contemplates the operation of each cycle divided into 6 contiguous time epochs of 8 clock pulses each. A transmit enable signal from the RC oscillator/timer 100 provided via line 101 or from the asynchronous enable input provided via line 102 to timing control 103 begins the set-up cycle. Clock pulses for each cycle are generated by the 60 Hertz (Hz) zero crossing detector 104 and are synchronized to the 60 Hz zero crossings of the power source to which detector 104 is connected by lines 105 and 106. Detector 104 provides a 120 Hz clock via line 107 to timing/control 103. These clock pulses are gated by the timing/control 103 to define the bit widths of the transmitted signal.

All functions occurring during the set-up cycle are provided for the entire duration of the time epochs during which the function is initiated. Timing/control 103 provides via control bus 108 address information to multiplexer 109. Multiplexer 109 has a plurality of inputs which are supplied with analog information which is to be transmitted to the central receiver. In the embodiment wherein the Expanded RMS Transmitter is associated with a distribution transformer, the analog inputs of multiplexer 109 are provided with load current information. The address provided to multiplexer 109 by timing/control 103 via control bus selects one of the analog inputs (XI, X2 or X3) of multiplexer 109 for the particular set-up cycle and provides the analog information available at the selected input to the peak detecting analog-to-digital converter 110 via line 111. The peak detecting mechanism of A/D converter 110 is a feedback loop in which a voltage level representing the digital output of converter 110 is compared to the present analog input. Converter 110 increments its digital output corresponding to an increasing analog level. When the peak level is reached, A/D converter 110 has as its output the digital representation of this peak. This representation remains on the output until a larger peak is detected or a reset applied. Depending on the timing of the set-up initialization, 3 or 4 peaks are passed through the converter in time epochs 2, 4 and 6.

Simultaneously with the address provided to multiplexer 110 to select an analog input, converter 110 is reset by timing/control 103 by reset information provided to converter 110 via control bus 108. Converter 110 calculates the digital representation of the analog information from the selected input during an entire epoch. The reset information provided to converter 110 by timing/control 103 via control bus 108 is supplied or not applied for an entire time epoch. Thereafter, the digital data provided to converter 110 via line 111 and corresponding to the analog information is provided to shift register 112 and is available for the next entire time epoch.

The following is an example of 6 contiguous epochs which, in one embodiment, would comprise the set-up cycle of the Expanded RMS Transmitter according to the invention. During time epoch 1 a reset signal is applied to converter 110 via control bus 108 by timing/control 103. Simultaneously, address information is provided to multiplexer 109 via control bus 108 by timing/control 103. This address information causes multiplexer 109 to switch one of the analog inputs, for example, analog input X1, through multiplexer 109 to converter 110 via line 111. During time epoch 2 the reset signal provided to converter 110 via control bus 108 is discontinued. The binary signals generated by A/D converter 110 corresponding to the analog information provided to analog input X1 represent the status of bits 2-8 of the 40 bit data word which is to be transmitted by the Expanded RMS Transmitter to the central receiver (see Table 1 below). Shift register 112 is a combination of five 8 bit shift registers in series. During epoch 2, these binary signals are provided in parallel to the first shift register of the five shift registers comprising shift register 112. Bit 1 provided by line 118 corresponds to a logic 1 reference and is also provided during epoch 2.

During time epoch 3 a reset signal is again applied to converter 110 with a different address being provided to multiplexer 109 thereby selecting a different input, for example, analog input X2, for switching through the multiplexer 109 to converter 110 via line 111. Simultaneously, 8 binary signals corresponding to 8 identification information are provided to shift register 112 by program card 113 (described below) via line 114. In particular, the 8 binary signals representing the status of bits 9–16 (see Table 1) of the 40 bit data word are provided to the second shift register of the five shift registers comprising shift register 112. During time epoch 4 the reset signal provided to converter 110 is discontinued. The binary signals generated by A/D converter 110 corresponding to the analog information provided to analog input X2 represent the status of bits 18–24 of the 40 bit data word which is to be transmitted by the Expanded RMS Transmitter to the central receiver. During time epoch 4, these binary signals are provided in parallel to the third of the five shift registers comprising shift register 112. Bit 17 provided by line 114 corresponds to the data in place 4 of the binary status of shift register 112 and is also provided during epoch 4.

During time epoch 5 a reset signal is again applied to converter 110 and an address provided to multiplexer 109 so that another analog input, such as analog input X3, is switched to converter 110 via line 111. Simultaneously, 8 binary signals corresponding to identification, reference, data and status information and are provided via lines 114, 115, 116, 117 and 118 to shift register 112. In particular, the 8 binary signals representing the status of bits 25–31 (see Table 1) of the 40 bit data word are provided to the fourth shift register of the five shift registers comprising shift register 112.

During time epoch 6 the reset signal which had been applied to converter 110 during epoch 5 is discontinued. The binary signals representing the status of bits 32–40 of the 40 bit data word are provided to the last of the five shift registers comprising shift register 112. These binary signals are generated by A/D converter 110 and corresponds to the information provided to analog input X3. At the end of time epoch 6 the 40 bit data word is set in register 112 and the set-up cycle of the transmitter is complete.

At the start of time epoch 7 the transmit cycle of the Expanded RMS Transmitter begins and the 40 bit data word is transmitted to the central receiver. The 40 bit data word is shifted serially out of the bank of shift registers comprising register 112 by a latch signal originating from timing control 103 and applied to register 112 via control bus 108. The serial shifting of the 40 bit data word is clocked in synchronization to the 60 Hz zero crossings of the power source as detected by detector 104. The bit length is thereby defined as the time between zero crossings. The data word is fed back via line 112a into a cyclic redundancy code (CRC) generator 119 and also provided via line 112b to a modulo 2 adder 120 which selectively passes the 40 bit data word or a 7 bit CRC word provided by generator 119. In the embodiment illustrated, during time epochs 7 through 11, the 40 bit data word is provided through adder 120 at a rate of 8 bits per epoch and during time epoch 12 the 7 bit CRC word alone with a trailing logic 0 bit is passed through adder circuit 120.

The data provided by modulo 2 adder 120 is differentially phase shifted keyd (DPSK) by DPSK generator 121. The phase shifts are snychronized to the clock pulses which are in turn synchronized to the 60 Hz zero crossings of the power source. The keyed data at the output of DPSK generator 121 is provided via line 122 to modulator 123 which modulates the data at one of four preselected carrier frequencies. The frequencies are derived from a master oscillator such as 1 MHz oscillator 124 the frequency of which is divided by programmable frequency divider 125. Program card 113 is associated with programmable frequency divider 125 to select the desired carrier frequency. The programmed inputs are set by the external program card 113 which also sets the 10 identification bits of the particular Expanded RMS Transmitter so that the central receiver can distinguish one particular transmitter from another. A signal at the resultant selected frequency is provided via line 126 through divide-by-two square wave generator 127 to produce the carrier frequency which is provided via line 128 to modulator 123.

The encoded modulated data is split into complementary outputs and provided by outputs 129 and 130 of modulator 123 to first amplifier stage including amplifiers 131 and 132, respectively. The voltage and current of the complementary outputs signals of encoded, modulated data are amplified by the first stage of amplifiers 131 and 132 powered by power supply 133 followed by a second stage of amplifiers 134 and 135. The amplified complementary signals are then applied to interstage current transformer 136, also powered by supply 133. Transformer 136 is coupled to the central receiver through tuned series LC circuit 137. In the embodiment illustrated, the outputs of LC circuit 137 are connected to the secondary of a power distribution transformer and the central receiver is associated with the primary (feeder) cable supplying the transformer. Specifically, one of the four selectable outputs 138 of LC tuned circuit 137 is chosen so that the resultant LC tuned circuit is matched to the preselected programmed frequency and the selected output is connected to the secondary of the power distribution transformer. Analog inputs X1, X2 and X3 are connected to transducers associated with the transformer for providing information relative to the transformer status.

Figure 2:
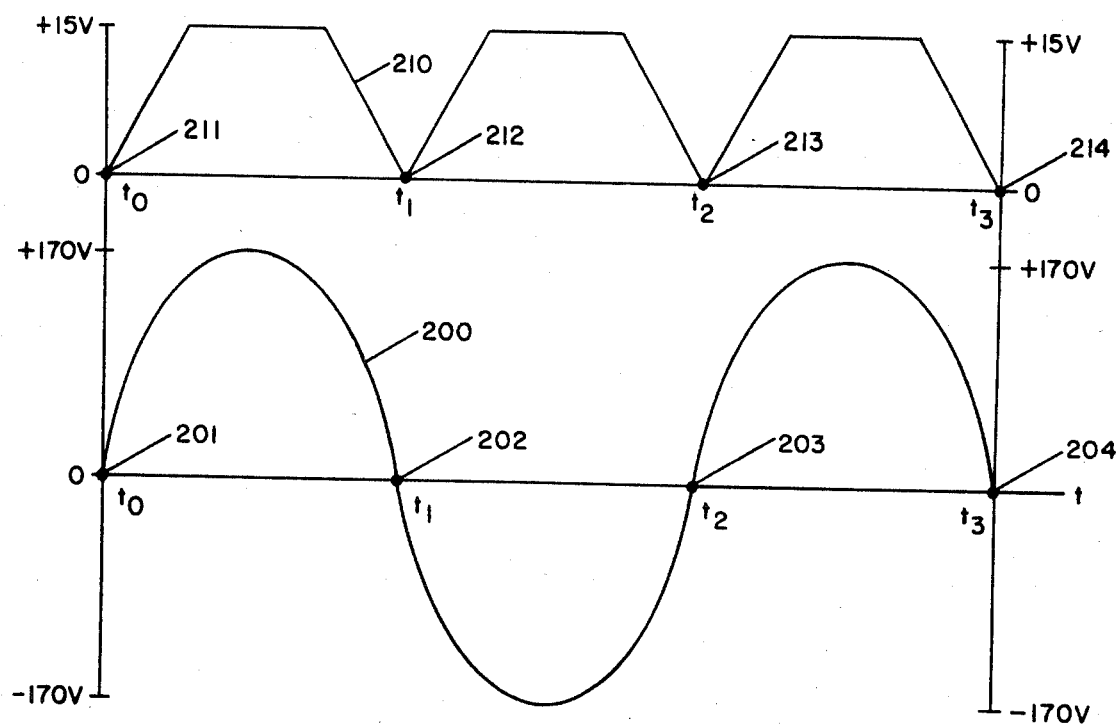
FIG. 2 is an illustration of the waveform at the input and output of an unregulated power supply.

Power supply 133 is coupled to the power source via line 139 and provides both regulated and unregulated outputs. Regulated output 140 supplies voltage regulator 141 which generates +5 volts for use as needed within the Expanded RMS Transmitter. Unregulated output 142 supplies a signal to the first amplifier stage including amplifiers 131 and 132 and to interstage current transformer 136. The waveform generated by unregulated output 142 is illustrated in FIG. 2. Curve 200 illustrates the waveform of a 120 volt AC power source, 60 Hz, single phase, with zero crossings 201, 202, 203 and 204 at times $t_0$, $t_1$, $t_2$ and $t_3$, respectively. Curve 210 illustrates a clipped unregulated output generated by power supply 133 which comprises a linearly increasing voltage leveling at 15 volts and then linearly decreasing with zero crossings 211, 212, 213 and 214 at times $t_0$, $t_1$, $t_2$ and $t_3$, respectively.

Referring to the waveform of the unregulated output as illustrated in FIG. 2 by curve 210, the output collapses to zero volts at the 60 Hz zero crossings 201–204 of the power source illustrated by curve 200. As a result, no power is provided by power supply 133 to the first amplifier stage including amplifiers 131 and 132, and to the interstage current transformer 136, at zero crossings 201-204. Therefore, the power of signals supplied to LC tuned circuit 137 is at a null during these zero crossings. As noted above, DPSK generator 121 is synchronized to the zero crossings so that the phase transitions of the data signal supplied by generator 121 occur at the zero crossings. In general, signal phase transitions cause transients in an LC circuit which can propagate into a solid state amplifier stage and stress the circuitry. By providing the first amplifier stage including amplifiers 131 and 132 and by providing the interstage current transformer 136 with no power during the phase transitions, the LC circuit 137 is provided with signals of low power during phase transitions so that the energy of any resulting transients is significantly diminished.

The following Table 1 illustrates the format of the Expanded RMS Transmitter data word which is stored in register 112 and provided to DPSK generator 121. As noted above, shift register 112 comprises the five 8 bit shift registers referred to in the left column by Nos. 1 through 5. Each shift register has 8 bit positions referred to in the center column by Nos. 1 through 40. The function of each bit of information is illustrated in the right column and has been discussed above. Specifically, the bits are a combination of reference bits, identification bits, data bits and bits representing the information provided to analog inputs X1, X2 and X3.

TABLE 1

| Shift Register | Bit Position | Function |
|---|---|---|
| | | DATA WORD FORMAT |
| 1 | 1 | Logic 1 Reference |
| 1 | 2 | X1:LSB |
| 1 | 3 | X1:MSB-5 |
| 1 | 4 | X1:MSB-4 |
| 1 | 5 | X1:MSB-3 |
| 1 | 6 | X1:MSB-2 |
| 1 | 7 | X1:MSB-1 |
| 1 | 8 | X1:MSB |
| 2 | 9 | ID:LSB |
| 2 | 10 | ID:MSB-8 |
| 2 | 11 | ID:MSB-7 |
| 2 | 12 | ID:MSB-7 |
| 2 | 13 | ID:MSB-5 |
| 2 | 14 | ID:MSB-4 |
| 2 | 15 | ID:MSB-3 |
| 2 | 16 | ID:MSB-2 |
| 3 | 17 | Data in 4 |
| 3 | 18 | X2:LSB |
| 3 | 19 | X2:MSB-5 |
| 3 | 20 | X2:MSB-4 |
| 3 | 21 | X2:MSB-3 |
| 3 | 22 | X2:MSB-2 |
| 3 | 23 | X2:MSB-1 |
| 3 | 24 | X2:MSB |
| 4 | 25 | ID:MSB-1 |
| 4 | 26 | ID:MSB |
| 4 | 27 | Logic O Reference |
| 4 | 28 | Data in 2 |
| 4 | 29 | Data in 1 |
| 4 | 30 | Data in 3 |
| 4 | 31 | Status Check Bit |
| 4 | 32 | Data in 2 (Status Memory) |
| 5 | 33 | Data in 5 |
| 5 | 34 | X3:LSB |
| 5 | 35 | X3:MSB-5 |
| 5 | 36 | X3:MSB-4 |
| 5 | 37 | X3:MSB-3 |
| 5 | 38 | X3:MSB-2 |
| 5 | 39 | X3:MSB-1 |

TABLE 1-continued

| Shift Register | Bit Position | Function |
|---|---|---|
| | | DATA WORD FORMAT |
| 5 | 40 | X3:MSB |

Figure 3:
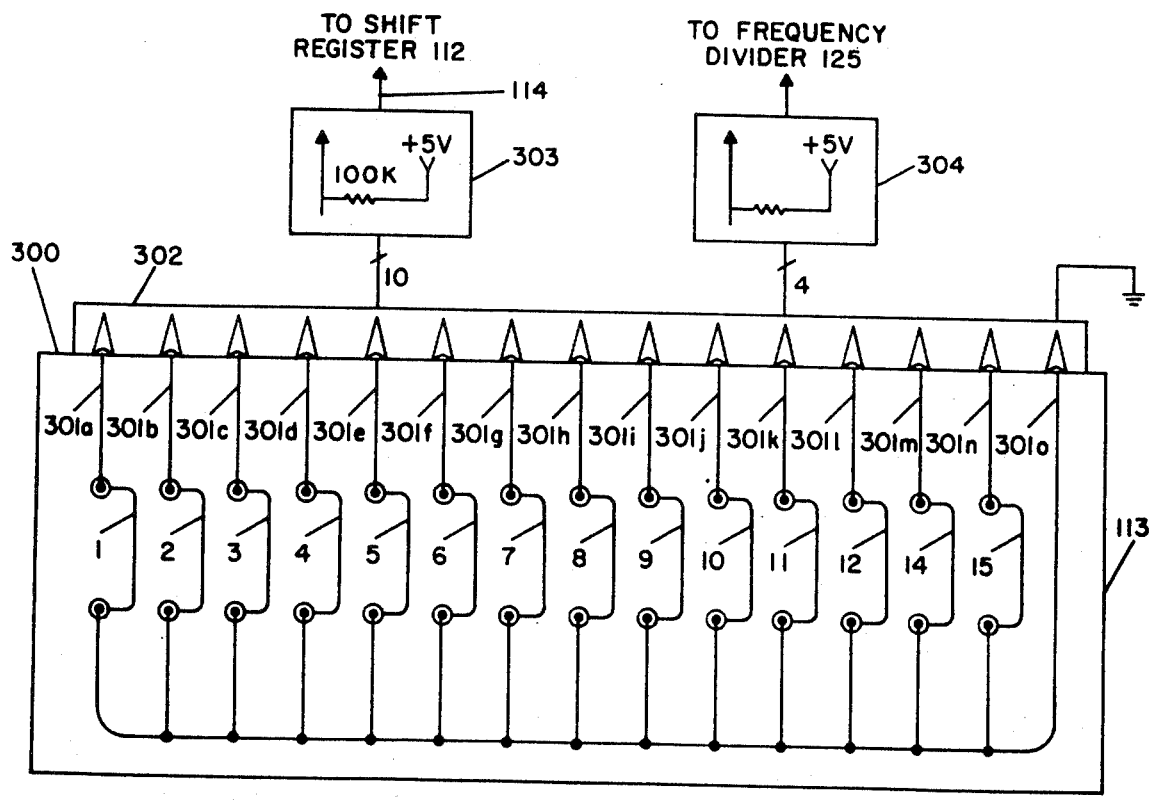
FIG. 3 is a circuit diagram of a program card.

FIG. 3 is a circuit diagram illustrating RMS program card 113 which is associated with programmable frequency divider 125 and shift register 112. Edge 300 of card 113 terminates in 15 connections 301a, 301b, . . . , 301o which are connected to 15 pin connector 302. Ten (10) of the pins of connector 302 are associated with resistor network 303 having an output connected to shift register 112 via line 114. Network 303 senses an open or closed contact on card 113 i.e. network 303 determines whether zero ohm jumpers 1-10 are in tact or have been broken. The open or closed status of jumpers 1-10 defines the identification of card 113 and the identification bits of the expanded RMS transmitter with which card 113 is associated. Specifically, each jumper is connected in parallel to a five (5) volt source via a 100K ohm resistor.

Similarly, four of the pins of connector 302 are associated with resistor network 304 having an output connected to programmable frequency divider 125 via binary frequency inputs. Network 304 senses whether zero ohm jumper 11-14 are in tact or have been broken. The open or closed status of jumpers 11-14 defines the frequency of divider 125 and determines which of the four selectable outputs 138 is used for proper matching. One of the pins of connector 302 is grounded and connected to the end of jumpers 1-14. The opposite end of jumpers 1-14 are connected to 15-pin connector 302. While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. An apparatus for transmitting, in digital form, first analog information provided at a first output, second analog information provided at a second output and third analog information provided at a third output, said apparatus comprising:
 (a) first means for providing the first, second and third analog information;
 (b) second means for converting the first, second and third analog information into digital information;
 (c) sequencing means for providing the digital information in the following sequence: digital information corresponding to the first analog information followed only by identification information followed only by digital information corresponding to the second analog information followed only by data information followed only by digital information corresponding to the third analog information;

(d) third means for storing the sequenced digital information provided by the sequencing means and for providing the sequenced digital information in sequential order;

(e) said sequencing means comprising input means for inputting said digital information into said third means, said input means responsive to a timing control means controlling the order which said digital information in input into said third means so that the digital information is stored in said third means in the sequenced order;

(f) fourth means for modulating a carrier signal with the sequenced digital information provided by the third means, said fourth means comprising coding means for coding the stored digital information and a modulator having complementary outputs for modulating the carrier signal with the coded information;

(g) fifth means for transmitting the modulated carrier signal along a secondary of a power distribution network, said fifth means comprising an amplifier, an interstage current transformer associated with said amplifier and a tuned circuit associated with said transformer and having a plurality of selectable outputs connected to the secondary of a power distribution network; and (h) timing means, responsive to a clock, for controlling the operation of the third means and the fourth means.

2. The apparatus of claim 1 wherein said third means stores a forty (40) bit data word.

3. The apparatus of claim 1 wherein said second means is an analog-to-digital converter associated with the first means.

4. The apparatus of claim 1 wherein said third means comprises a shift register.

5. The apparatus of claim 1 wherein said coding means comprises a differentially phase shift keyed (DPSK) generator.

* * * * *